US007477647B2

(12) United States Patent
Choi et al.

(10) Patent No.: US 7,477,647 B2
(45) Date of Patent: Jan. 13, 2009

(54) METHOD OF CONTROL COMMON CALL CONNECTION AND MEDIA GATEWAY FOR EXECUTING THE METHOD

(75) Inventors: Seunghan Choi, Daejeon (KR); Tae-Gyu Kang, Daejeon (KR); Do Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 976 days.

(21) Appl. No.: 10/837,292

(22) Filed: Apr. 29, 2004

(65) Prior Publication Data

US 2005/0094650 A1 May 5, 2005

(30) Foreign Application Priority Data

Oct. 31, 2003 (KR) .................. 10-2003-0077059

(51) Int. Cl.
*H04L 12/28* (2006.01)
(52) U.S. Cl. ........................... 370/401; 370/466
(58) Field of Classification Search ........................ None
See application file for complete search history.

(56) References Cited

U.S. PATENT DOCUMENTS

| 2002/0061014 A1* | 5/2002 | Saller ........................ 370/352 |
| 2003/0067929 A1* | 4/2003 | Matsuzawa ................. 370/401 |
| 2003/0072330 A1 | 4/2003 | Yang et al. |
| 2004/0090954 A1* | 5/2004 | Zhang et al. ................ 370/352 |
| 2006/0133386 A1* | 6/2006 | McCormack et al. .. 370/395.52 |

OTHER PUBLICATIONS

"Implementation and Design of a SIP VoIP Gateway", M. Lee, et al., 2002 Proceedings of the 17th KIPS Spring Conference (English translation of the Abstract of non-patent reference M. Lee et al. Abstract.

* cited by examiner

*Primary Examiner*—Firmin Backer
*Assistant Examiner*—Rhonda Murphy
(74) *Attorney, Agent, or Firm*—Blakely, Sokoloff, Taylor & Zafman LLP

(57) ABSTRACT

The present invention relates to a method of controlling common call connection and a media gateway for executing the method, which are capable of performing call connection control without a change in a control procedure under different protocols and the interworking of the different protocols. In the method of the present invention, each of a plurality of termination points connected by a call in the media gateway, each of a plurality of multimedia services transmitted and received between the terminations through connection setup of the call and each of a plurality of physical resources per multimedia service in the multimedia are defined as a termination, a stream and a channel, respectively, a call processing request based on one of various media gateway control protocols is mapped into a model defined as described above, and resource allocation, connection setup or release with respect to a channel belonging to a call and a termination are requested according to the type of the call processing request. Accordingly, the method of the present invention accommodates call processing based on various types of protocols.

14 Claims, 10 Drawing Sheets

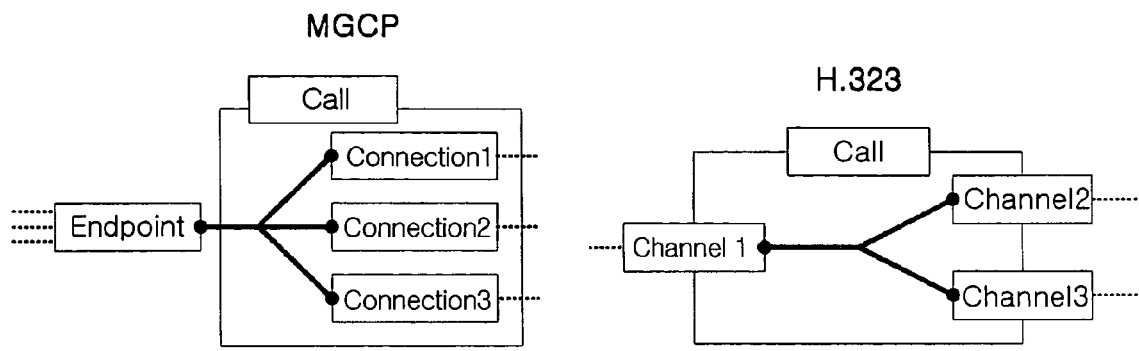
Prior art
FIG. 1a
Prior art
FIG. 1b
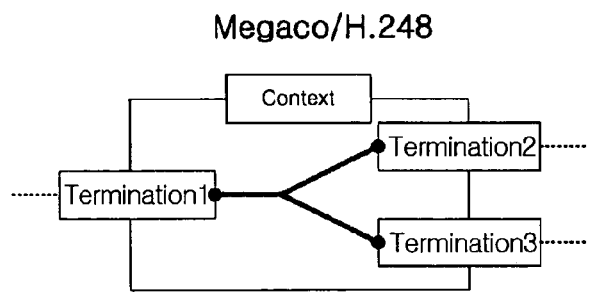
Prior art
FIG. 1c
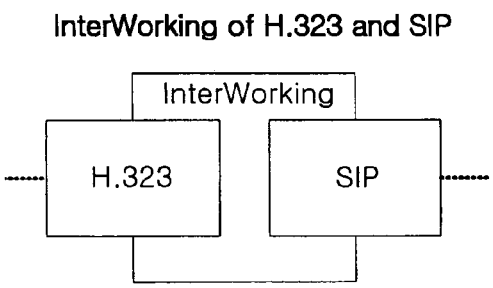
Prior art
FIG. 1d
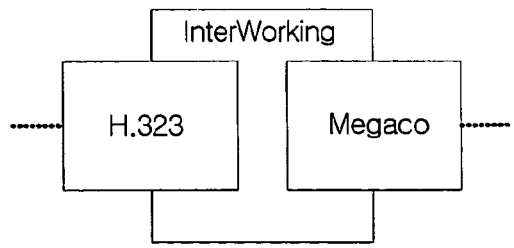
Prior art
FIG. 1e

METHOD OF CONTROL COMMON CALL CONNECTION AND MEDIA GATEWAY FOR EXECUTING THE METHOD

BACKGROUND OF THE INVENTION

1. Field of the Invention

The present invention relates generally to call processing in a media gateway and, more particularly, to a method of controlling common call connection and a media gateway for executing the method, which are capable of performing call connection control without a change in a control procedure under different protocols and the interworking of the different protocols.

2. Description of the Related Art

A media gateway is a device for converting the type of a traffic format according to a communication network. The media gateway functions to convert the Time Division Multiplexing (TDM) traffic of a circuit network into the Asymmetric Transfer Mode (ATM) or Internet Protocol (IP) traffic of a packet network chiefly in a next-generation packet voice transmission network. The media gateway is allowed to interwork with a softswitch by a control protocol (for example, Media Gateway Control Protocol (MGCP), Megaco, etc.) and determines traffic flow paths to control calls. The transmission of information between a plurality of media gateways is performed using Real-time Transport Protocol (RTP) in the case of IP, or using Permanent Virtual Connection (PVC) or Switched Virtual Connection (SVC) in the case of ATM.

For the control protocols of a Media Gateway, there exist a Megaco/H.248 of International Telecommunication Union-Telecommunication Standardization Sector (ITU-T) and Internet Engineering Task Force (IETF) and MGCP of IETF. For a signaling protocol that can be installed when such a media gateway is used as a gateway, there exist Session Initiation Protocol (SIP) of IETF and H.323 of ITU-T. These protocols are installed in the media gateway, and function to control sources, such as a TDM channel and a RTP channel, the attributes of channels and call connection.

MGCP is a set of rules that governs how information is to be exchanged between a Media Gateway Controller (MGC) and a media gateway. As an MGC and a media gateway were separated from each other by dividing the function of a conventional media gateway in which a signaling plane and a control plane existed in the same system, MGCP was proposed to cope with the separation. MGCP has the functional characteristics of supporting the implementation of various services in the media gateway controller. MGCP is currently used widely on Voice over Internet Protocol (VoIP), and has defects in scalability and multimedia service support.

For the new control protocol of a media gateway having functions, such as scalability, to overcome the defects of the MGCP and support various VoIP services, there exists Megaco/H.248. For technology for supporting multimedia services under a Local Area Network (LAN) that does not guarantee Quality of Service (QoS), there exist H.323, which is currently used widely on IP networks to support telephony services. However, H.323 has disadvantages in simplicity and scalability, so that the advantages of SIP are highlighted. Currently, many companies have developed SIP and have applied and used SIP to and on IP networks. H.323 and MGCP have some disadvantages. However, H.323 and MGCP are currently used widely on IP networks to support Internet telephony services, and have advantages in view of service stability.

Since the various control protocols of a media gateway described above are being used, media gateway manufacturers must manufacture media gateways having structures capable of supporting the various protocols.

In particular, methods of controlling call processing are different from each other according to the control protocols of a media gateway, so that methods of controlling call connection in a media gateway are different from each other according to the control protocols. In the past, whenever a new protocol was installed in a media gateway, there was the inconvenience of changing a method of controlling call connection accordingly.

FIGS. 1a to 1e are views illustrating call connection control models based on various protocols. FIG. 1a is view showing a call connection model based on MCGP, which includes 'call' corresponding to a call, and 'endpoint' and 'connection' corresponding to channels that are connected to each other in the call. FIG. 1b is a view showing a call connection control model based on H.323 signal protocol, which includes 'call' corresponding to a call and 'channel' corresponding to a channel. FIG. 1c is a view showing a call connection control model, which includes 'context' corresponding to a call and 'termination' corresponding to a channel.

When call connection is performed between different services, call connection may be controlled by the interworking of different protocols. FIG. 1d is a view showing the interworking of H.323 and SIP. FIG. 1e is a view showing the interworking of H.323 and Megaco.

It can be appreciated from the above that call connection models are different from each other according to the protocols. Accordingly, inconvenience arises in that, whenever a new protocol is applied to a media gateway, a method of controlling call connection must be changed.

Since call connection control Application Program Interfaces (APIs) provided to control a media gateway are different from each other according to manufacturers, it has been further necessary to implement the porting of call connection control APIs according to protocols.

For reference, there has been proposed a VoIP gateway using SIP that can reduce control time by controlling media processing using SIP that is a specific type of call control protocol (Myeonggun LEE, "VoIP gateway design and implementation based on SIP," Proceedings (second volume) of Spring academic thesis conference of Korea Information Processing Society, Vol. 9, No. 1, Apr. 13, 2002).

The thesis discloses a method of controlling call based on a specific call control protocol, and does not solve the problems of the preceding technologies.

SUMMARY OF THE INVENTION

Accordingly, the present invention has been made keeping in mind the above problems occurring in the prior art, and an object of the present invention is to provide a method of controlling common call connection and a media gateway for executing the method, which are capable of performing call connection control without a change in a control procedure under different protocols and the interworking of the different protocols.

In order to accomplish the above object, the present invention provides a method of controlling common call connection in a media gateway for converting a traffic format according to a communication network, including the steps of defining each of a plurality of termination points connected by a call in the media gateway as a termination, each of a plurality of multimedia services transmitted and received between the terminations through connection setup of the call as a stream, and each of a plurality of physical resources per multimedia service in the multimedia as a channel; receiving a call processing request based on a specific media gateway control protocol; if the call processing request is a connection setup request, receiving information corresponding to the defined channel and stream from the media gateway control protocol, and creating a switch channel structure for setting up a termination and a stream per channel that belongs to the call; comparing the created switch channel structure with existing switch channel structures and creating a switch entry structure for setting up connection between channels that belong to a same stream; and requesting resource allocation and physical connection setup for the channel based on the created switch channel structure and switch entry structure.

If the call processing request is a termination change request, the method further includes the steps of searching the existing switch channel structures for a switch channel structure associated with a channel designated in the termination; searching for a switch entry structure for managing connection setup of the switch channel structure found at the step of searching; analyzing status information of switch channel structures including in a found switch entry structure, and correcting status information of the switch entry structure based on a result of the analysis; and requesting attribute and connection setup of the corresponding channel according to the corrected status information of the switch entry structure.

If the call processing request is a call and termination connection release request, the method further includes the steps of searching for a switch channel structure associated with designated call and termination; searching for a switch entry structure associated with the found switch channel structure; deleting the switch entry structure found at the step of searching; and requesting release of channel allocation and channel connection associated with the switch entry structure deleted at the step of deleting.

The method further includes the step of creating and updating a switch channel save structure for managing a switch channel structure list of channels associated with a stream.

In the method, the switch channel structure includes a field indicating a termination to which a corresponding channel belongs, a field indicating the corresponding channel, a field indicating a switching mode of the corresponding channel, and a field indicating an IDentification (ID) of a stream to which the corresponding channel belongs; and the switch entry structure includes a switch entry type field indicating a type of information of connection between channels, a field indicating a call to which corresponding connection information belongs, a field indicating a stream to which corresponding channel connection belongs, and fields indicating switch channel structures for managing information of two channels to be connected to each other, and a field indicating multiplexing functions of the channels when a multimedia service is implemented.

In the method, the step of creating the switch channel structure includes the steps of receiving a switch channel structure creation request with respect to a corresponding channel that belongs to the call, the connection. setup of which has been requested; allocating predetermined memory to the switch channel structure; and storing a termination value, a channel value, a mode value and a stream ID corresponding to a corresponding channel in the allocated memory.

In the method, the step of creating the switch entry structure includes the steps of searching the switch channel save structure for a switch channel structure list with respect to a channel that belongs to a stream designated in a call, connection setup of which has been requested, and that is previously set up; creating a switch entry structure for designating connection with respect to the corresponding switch channel structure based on information of the found switch channel structure and the created switch channel structure; adding the created switch entry structure to a switch table structure for managing a switch entry structure list; and adding a newly connected switch channel structure to the switch channel save structure.

In the method, the step of searching for the switch channel structure includes the steps of searching a switch channel save structure list for the switch channel save structure having a stream ID corresponding to the termination the change of which has been requested; searching for a switch channel structure of channels that belong to the switch channel save structure found at the step of the searching; and providing a found switch channel structure.

In the method, the step of deleting the switch entry structure includes the steps of extracting a currently created switch entry structure list from a switch table structure; extracting information of a switch channel structure that belongs to the switch entry structure; and deleting the switch entry structure having a termination value corresponding to the termination the release of which has been requested, and deleting the switch entry structure from the switch table structure list.

In order to accomplish the above object, the present invention provides a media gateway, including a plurality of media gateway control units for requesting call connection, release of connection and change of connection according to installed media gateway control protocols; a common call processing unit for defining a call, processing of which has been requested by one of the media gateway units, using two or more terminations corresponding to a plurality of endpoints to be connected in the call, one or more streams that belong to each of the terminations, and one or more channels corresponding to media resources that belong to each of the streams, and making requests for resource allocation to a channel belonging to a corresponding termination, connection setup between channels, and resource allocation and connection release and connection status information change with respect to a channel belonging to a designated termination when call processing has been requested; an interface unit for transferring the requests of the common call processing unit to respective devices; a Digital Signal Processing (DSP) unit for instructing a digital processing unit associated with a designated link to perform physical circuit connection and channel allocation according to the requests transferred through the interface unit; a plurality of DSP units connected to physical circuits to perform allocation of a physical resource and release of allocation with respect to a corresponding channel according to instructions of the DSP control unit; and a switch fabric for performing physical connection and release of a physical resource allocated to a channel according to instructions of the DSP control unit.

In the media gateway, the common call processing unit creates, manages and deletes a switch channel structure for managing information of channels that belong to each termination, a switch entry structure for managing information of connection between the channels, a switch table structure for managing a switch entry list, and a switch channel save structure for managing switch channel structures of channels that belong to a single call.

In the media gateway, the common call processing unit includes a switch channel structure creating unit for creating a switch channel structure for managing information of channels belonging to a corresponding termination in response to a request for setup of a new call or the termination; a switch entry structure creating unit for creating a switch entry structure for managing information of connection of a corresponding channel to other channels when the switch channel structure is created in the switch channel structure creating unit; a switch channel structure searching unit for searching for a switch channel structure associated with a designated termination when information change and release of connection of a call or the designated termination is requested; a switch entry structure searching unit for searching for a switch entry structure associated with the switch channel structure found by the switch channel structure searching unit; a status information correcting unit for analyzing status information of channels belonging to the switch entry structure found by the switch entry structure searching unit and correcting the status information; and a deleting unit for deleting all switch entry structures associated with the switch channel structure found by the switch channel structure searching unit.

BRIEF DESCRIPTION OF THE DRAWINGS

The above and other objects, features and advantages of the present invention will be more clearly understood from the following detailed description taken in conjunction with the accompanying drawings, in which:

FIGS. 1a to 1e are views illustrating call connection control models based on various protocols;

DESCRIPTION OF THE PREFERRED EMBODIMENTS

Figure 2:
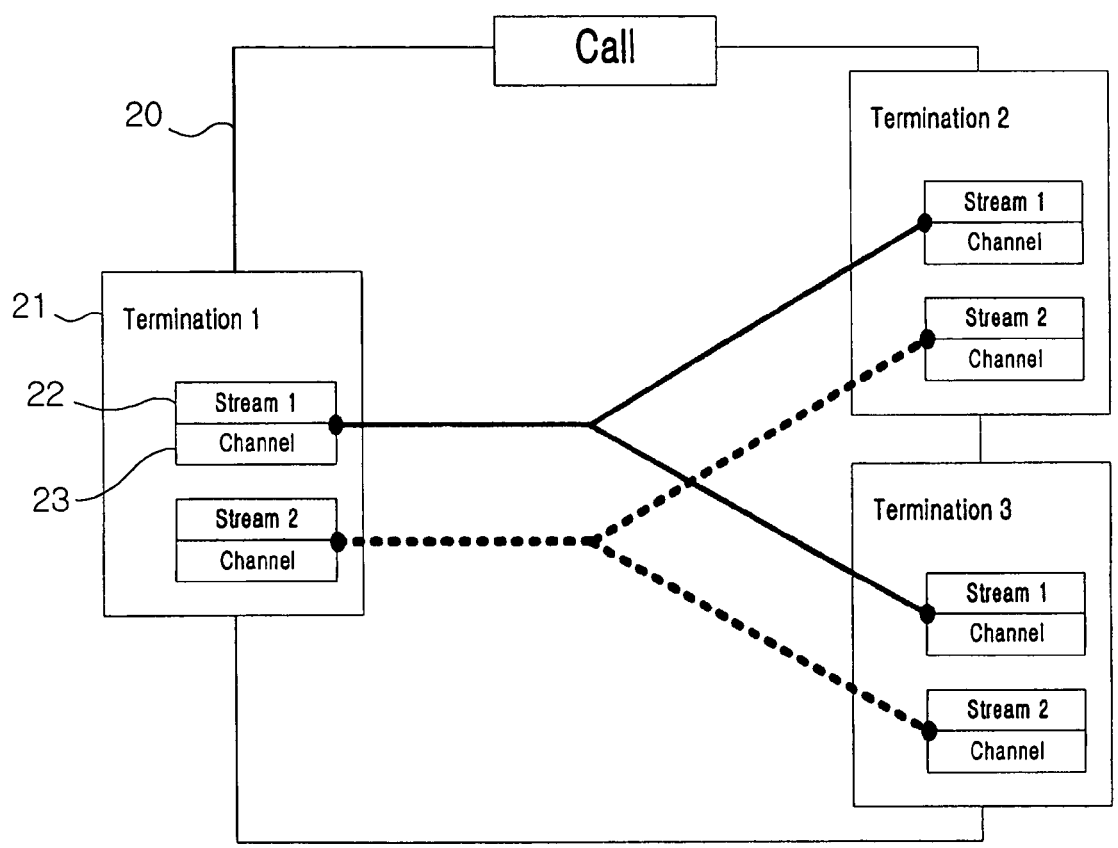
FIG. 2 is a schematic diagram showing the common call connection control model of the method of controlling common call connection according to the present invention.

Reference now should be made to the drawings, in which the same reference numerals are used throughout the different drawings to designate the same or similar components.

With reference to the attached drawings, a method of controlling common call connection and a media gateway for executing the method are described below.

FIG. 2 is a schematic diagram showing the basic concept of the method of controlling common call connection according to the present invention. In the present invention, each of a plurality of endpoints that are connected by a single call 20 is defined as a 'termination' 21, each of a plurality of multimedia services transmitted and received between the terminations 21 through the connection setup of the call 20 is defined as a 'stream' 22, and each of a plurality of physical resources per multimedia service, such as video and audio, provided through the call 20 is defined as a 'channel' 21.

In that case, two or more terminations 21 may be involved in the call 2, and the existing terminations 21 are connected to each other. For example, in the case of a one-to-one call, two connected terminations are defined for the call, and in the case of a three party call, three connected terminations are defined for the call.

The stream 22 is a concept defined to support a multimedia service, and is formed by assigning an identifier, that is, a stream IDentification (ID), to a multimedia service. The stream 22 is used as a basic unit to be processed in the media gateway. The stream 22 includes information corresponding to an actual channel. For example, in the case of a TDM interface, the information may correspond to TDM channel, and in the case of Ethernet interface based on an IP, the information may correspond to a RTP or User Datagram Protocol (UDP) channel.

In general, a multimedia is a term that refers to the combination of two or more of text, sound and video. The multimedia may be classified into the combination of text and sound, the combination of text, sound, and images or animated graphic images, the combination of text, sound and video images, or the combination of video and sound.

The channel 23 is a physical resource representing a media, such as video or audio. When the multimedia service described above is provided, two or more channels can exist in a stream.

The method of controlling call connection according to the present invention is intended to handle multimedia services as well as both voice and data communications. One or more channels are defined in a single stream.

Meanwhile, the stream 22 may refer to control information for controlling video or audio.

In the method of controlling common call connection, connection requests, connection release requests and update requests with respect to calls based on MGCP, H.323, Megaco/H.248, the interworking of different protocols, etc. are processed after being mapped into the common call connection control model of FIG. 2, so that they can be processed without a change in a call connection control procedure even though a different protocol is installed.

Figure 3:
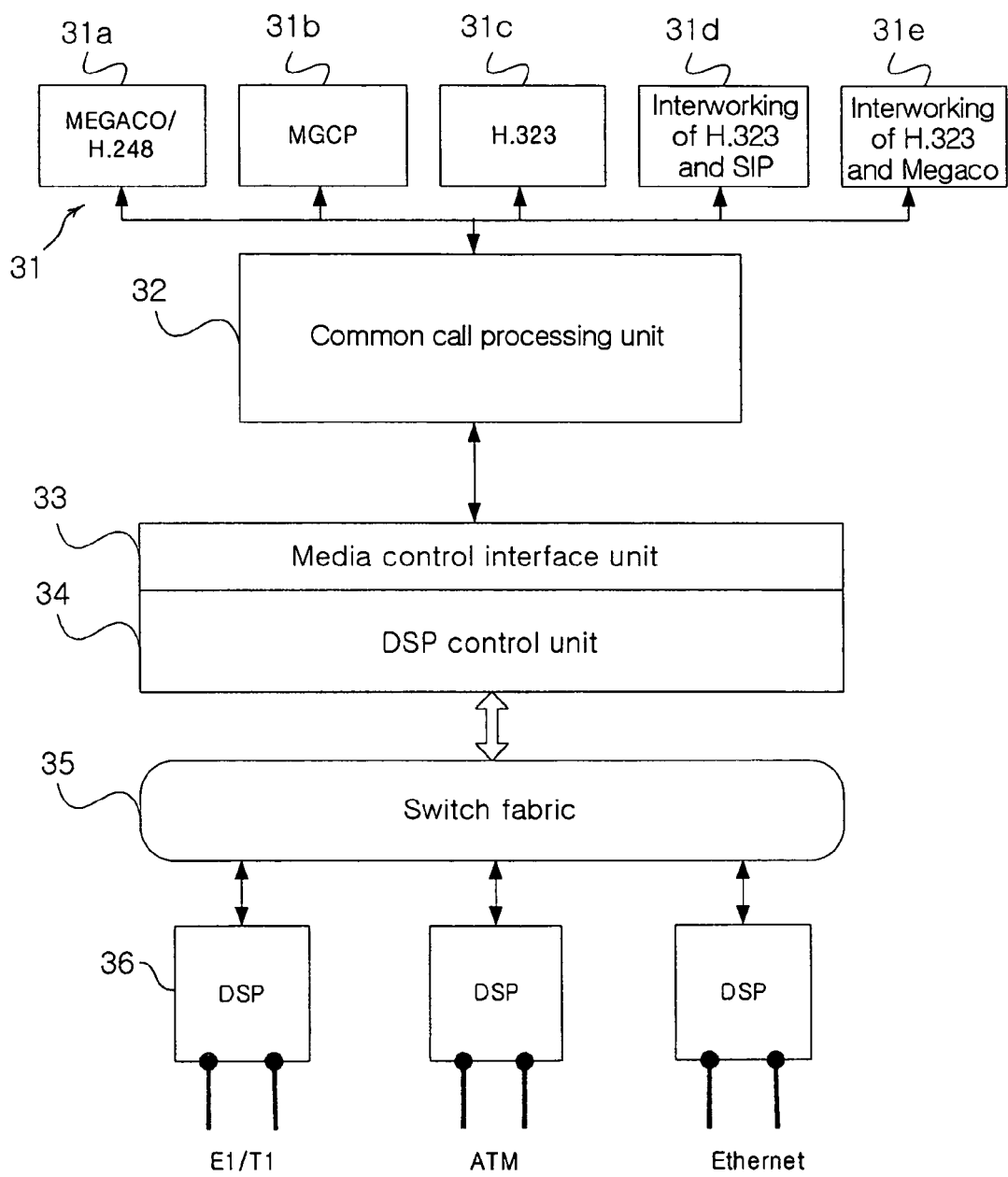
FIG. 3 is a block diagram showing the construction of a media gateway to which the method of controlling common call connection is applied.

FIG. 3 is a block diagram showing the construction of a media gateway to which the method of controlling common call connection is applied. The media gateway of the present invention includes media gateway control units 31a to 31e (31), a common call processing unit 32, a media control interface unit 33, a Digital Signal Processing (DSP) control unit 34, a switch fabric 35 and a plurality of DSP units 36. The media gateway control units 31a to 31e (31) control call connection according to Megaco/H.248, MGCP, H.323, the interworking of H.323 and SIP and the interworking of H.323 and Megaco. The common call processing unit 32 is provided with a common call connection control model defined in such a way that a call is composed of a plurality of terminations, a plurality of streams and a plurality of channels, maps different types of call connection requests, information change requests and connection release requests into the common call connection control model, and makes call connection requests, information change requests and connection release requests based on the mapping. The media control interface unit 33 transfers the requests to various units. The DSP control unit 34 controls physical circuit connection and channel allocation according to the requests transferred through the media control interface unit 33. The switch fabric 35 physically connects a plurality of circuits connected to the media gateway or releases the connection of the circuits under the control of the DSP control unit 34. A plurality of DSP units 36 are located between the switch fabric 35 and a plurality of circuits, such as E1/T1, ATM and Ethernet circuit, and perform channel allocation and digital signal processing for the circuits.

The common call processing unit 32 intermediates between the media gateway control units 31a to 31e, which control the media gateway according to the various protocols, and the media control interface unit 33, and converts various types of call connection requests, information change requests and connection release requests based on the various control protocols of the media gateway into the same format by mapping the call connection requests, the information change requests and the connection release requests into the common call connection control model defined as in FIG. 2.

The detailed operation of the common processing unit 32 is described with reference to FIG. 5.

Figure 5:
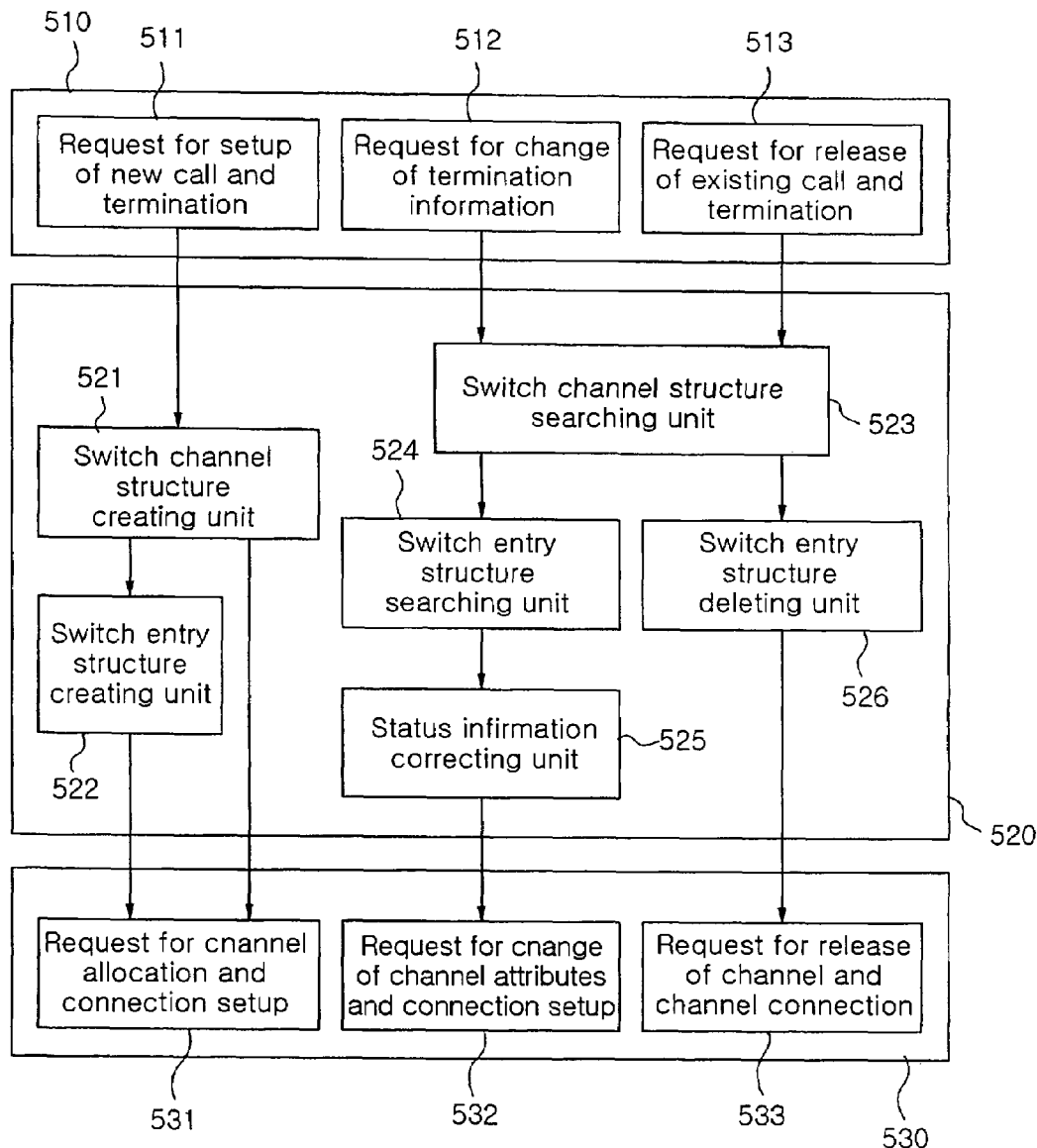
FIG. 5 is a view showing the detailed construction of the common call processing unit of the media gateway of FIG. 1 according to the present invention.

FIG. 5 is a view showing the detailed construction of the common call processing unit 32 according to the present invention.

When a request for the processing of call connection control 512 according to a specific protocol is made in one of a media gateway control unit 31a and 31e that are operated according to different protocols, the request 512 is transferred to the switch channel structure creating unit 521 of the common call processing unit 32. In the switch channel structure creating unit 521, there is created a switch channel structure for managing the information of a channel belonging to two or more terminations that belong to a call the connection of which has been requested by the media gateway control unit 31a, 31b, 31c, 31d or 31e.

Figure 4A:
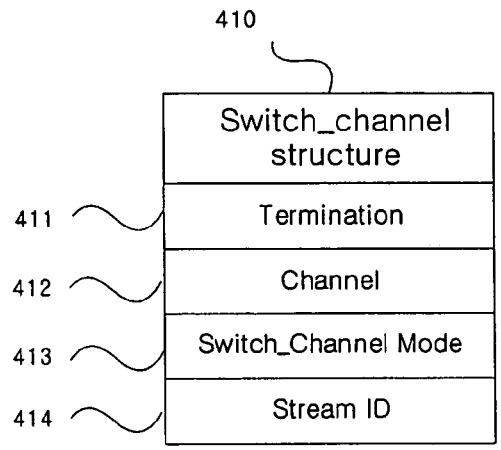
FIGS. 4a to 4d are diagrams showing the structures of tables for call connection control that are used in the method of controlling common call connection.

The switch channel structure is a table for managing the channel information. As shown in FIG. 4a, the switch channel structure includes a termination field 411 indicating a termination to which a corresponding channel belongs, a channel field 412 indicating the information of a channel resource, a channel mode field 413 indicating the data processing method of the corresponding channel, and a stream ID field 414 indicating the ID of a stream to which the corresponding channel belongs. The switch channel structure creating unit 521 transfers the created switch channel structure to the DSP control unit 34 through the media control interface 33, the DSP control unit 34 requests the assignment of a resource to the corresponding channel from a corresponding DSP unit 36, and the corresponding DSP unit 36 assigns the resource to the corresponding channel.

Figure 4B:
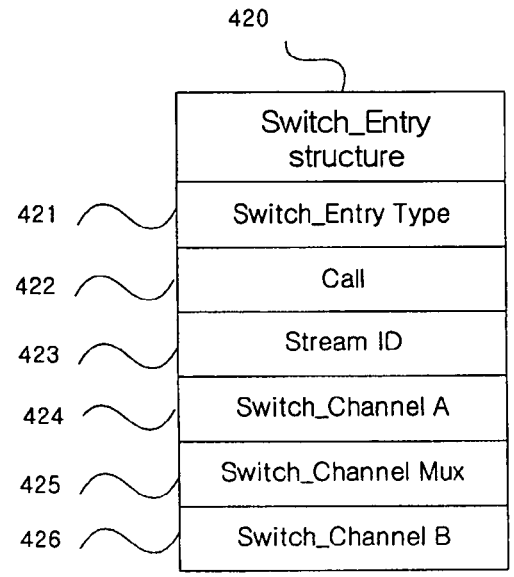

Furthermore, the created switch channel structure is transferred to the switch entry structure creating unit 522 of the common call processing unit 32, and the switch entry structure creating unit 522 creates a switch entry structure for managing connection setup per channel based on the information of the switch channel structure. The switch entry structure, as shown in FIG. 4b, includes a switch entry type field 421 indicating the type of the information of connection between channels, a call field 422 indicating the information of a call to which corresponding channel connection belongs, a stream ID field 423 indicating the ID of a stream to which a corresponding channel belongs, switch channel structure fields 424 and 426 indicating switch channel structures for channels that will be connected, and a switch channel multiplexing field 425 supporting multiplexing when a multimedia service is implemented. The common call processing unit 32 requests channel connection setup from a corresponding DSP unit 36 through the media control interface 33 based on the information of the switch entry structure created as described above.

Meanwhile, a request for changing information about termination may be made in a media gateway control unit 31a, 31b, 31c, 31d or 31e.

As shown in FIG. 5, when the media gateway control unit 31a, 31b, 31c, 31d or 31e makes the request for the information change of a termination 512 in the common call processing unit 32, the request 512 is transferred to the switch channel structure searching unit 423 of the common processing unit 32 and the switch channel structure searching unit 423 searches for a switch channel structure associated with a corresponding termination the information change of which is requested. If, as a result of the search, the switch channel structure associated with the termination exists, the switch channel structure is transferred to the switch entry structure searching unit 534 and connection setup associated with the corresponding channel is searched for.

If, as a result of the search, the channel associated with the termination, the information change of which has been requested, and connection information associated with the channel exist, the status information of the switch channel structures of the switch entry structure is transferred to an information correcting unit 525. The information correcting unit 525 analyzes the status information of the switch channel structures of the switch entry structure, and changes the statute information based on a result of the analysis. In this case, the status information corresponds to the request for setting up channel connection. As occasion demands, a request for changing the attribute of the channel and setting up connection between channel connections 532 is requested from the DSP unit 36 through the control interface 33.

Meanwhile, a media gateway control unit 31a, 31b, 31c, 31d or 31e may make a request for releasing a call and terminations the connection of which has been set up 513.

In this case, the request 513 of the media gateway control 31a, 31b, 31c, 31d or 31e is input to the switch channel structure searching unit 523, and the switch channel structure searching unit 523 searches for channel information associated with the call and termination the release of which has been requested, that is, a switch channel structure.

The switch channel structure searching unit 523 transfers a found switch channel structure to a deleting unit 526, and requests the deletion of the switch channel structure from the deleting unit 526. The deleting unit 526 makes a request for releasing the channels allocated to the DSP unit 36 and connection setup between channels 533 through the media control interface 33.

The common call processing unit 32 maps call connection requests and connection release requests based on different protocols having different control models into the predefined common control model and then processes the requests in a common manner, so that the DSP control unit 34 and the DSP unit 36 below the common call processing unit 32 can perform call connection and the release of connection in a uniform manner.

The operation of the units 521 to 526 of the common call processing unit 32 of the common call processing unit 32 is described with reference to FIGS. 6 to 11 in detail below.

Figure 6:
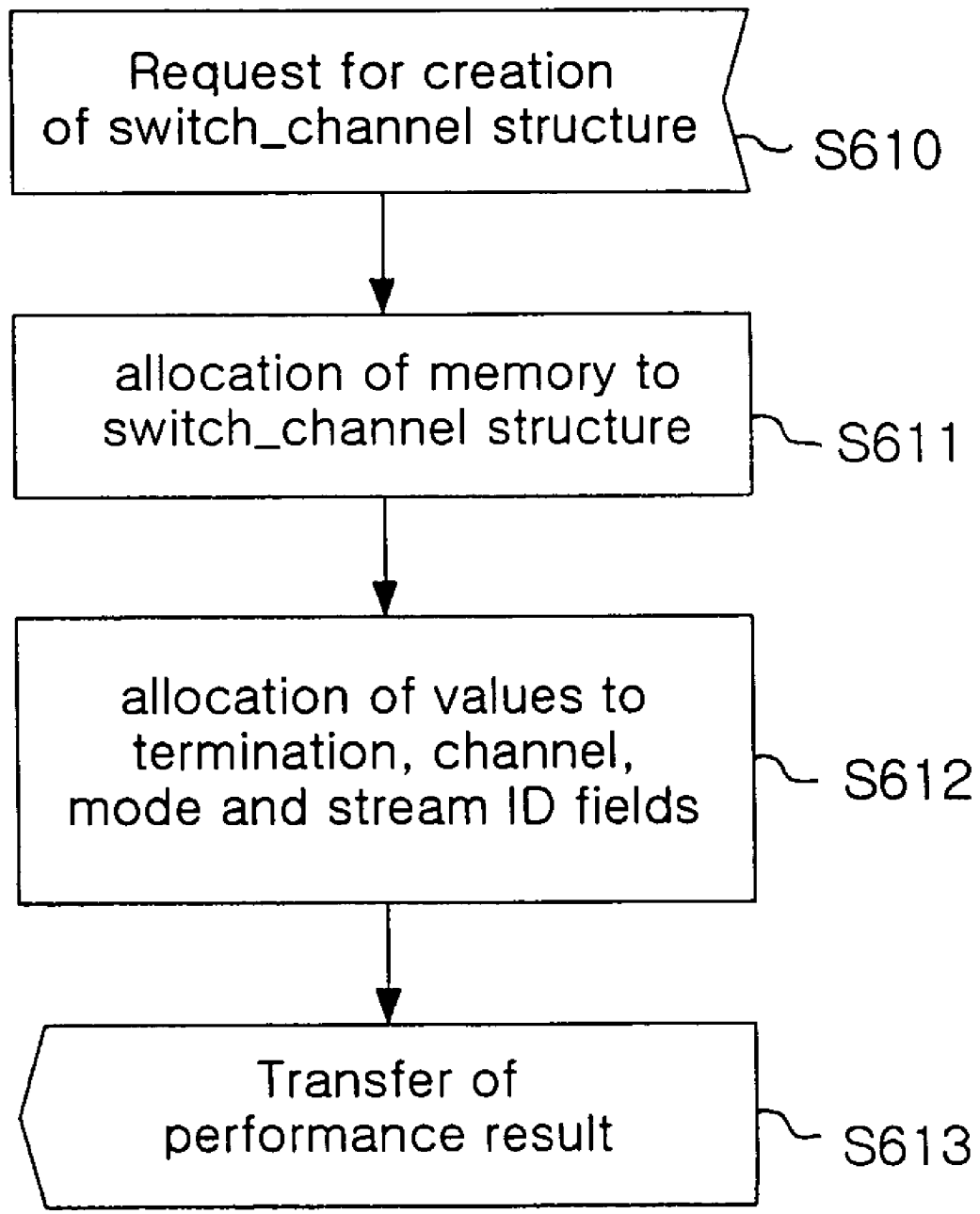
FIG. 6 is a flowchart showing the operation of the switch channel structure creating unit of FIG. 5.

The operation of the switch channel structure creating unit 521 is described with reference to FIG. 6. When the creation of a switch channel structure is requested at S610, memory is allocated to a switch channel structure to be created at step S611. The corresponding values of a call request message input from the media gateway control unit 31a, 31b, 31c, 31d or 31e are allocated to the termination field 411, channel field 412, channel mode 413 and stream ID field 414, respectively, at step S612. Thereafter, a switch channel structure created as described above is provided to the switch entry structure creating unit 522 of the common call processing unit 32, and is transferred to the DSP unit 34 through media control interface unit 33 to request the allocation of a resource to a corresponding channel.

Figure 7:
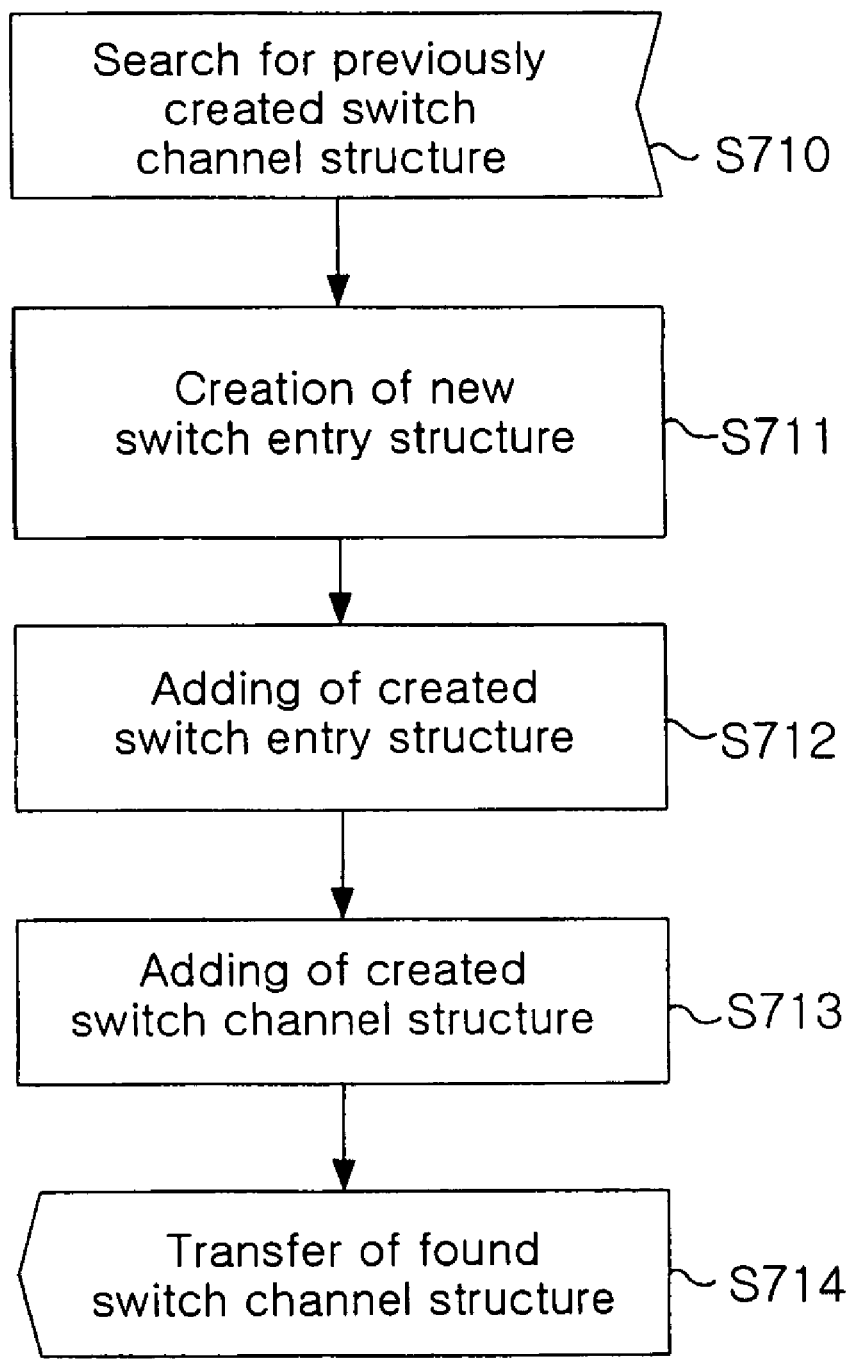
FIG. 7 is a flowchart showing the operation of the switch entry structure creating unit of FIG. 5.

FIG. 7 is a flowchart showing the operation of the switch entry structure creating unit 522. When a switch channel structure is created by the switch channel creating unit 621, a switch channel save structure associated with the stream ID allocated to the switch channel structure is searched for at step S710.

The switch channel save structure is used to manage all the channels (that is, switch channel structure) existing in a single call. The switch channel save structure is used to create a switch entry structure by combining a new switch channel structure with a previously created switch channel structure whenever the new switch channel structure is created. The switch channel save structure, as shown in FIG. 4d, includes a stream ID field 441, a No MUX switch channel list field 442, and a MUX switch channel list field 443. With the above-described construction, channels belonging to each stream are separately managed by a switch channel structure list for channels having a multiplexing function and a switch channel structure list for channels having no multiplexing function.

Figure 4C:
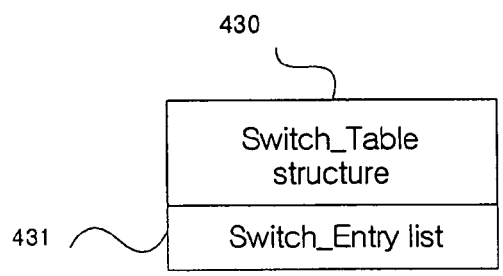
Figure 4D:
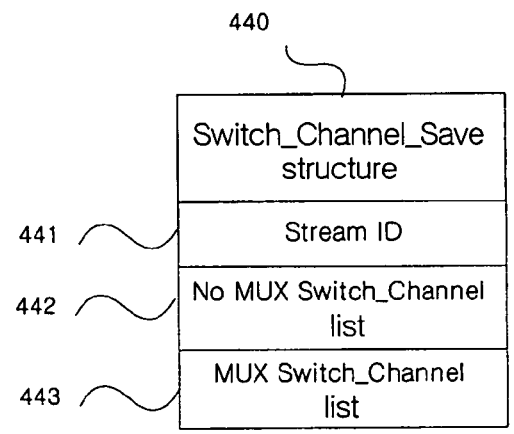

Further, a switch table structure shown in FIG. 4c is created and managed in the common call processing unit 32. The switch table structure is used to manage a list of created switch entry structures.

The operation of the switch structure creating unit 522 is described with reference to FIG. 7. If, as a result of the search at step S710, a previously created switch channel structure corresponding to a designated stream ID exists, a new switch entry structure is created using the information of the previously created switch channel structure and the switch channel structure newly created by the switch channel structure creating unit 521 at step S711. The newly created switch entry structure is added to a switch table structure list at step S712. The newly created switch channel structure is added to a switch channel save structure list at step S713. The performance result of the unit 522 is transferred at step S714.

The common call processing unit 32 requests the setup of connection with a channel allocated to the DSP unit 36 through the media control interface unit 33 according to the result of the switch entry creating unit 522.

Figure 8:
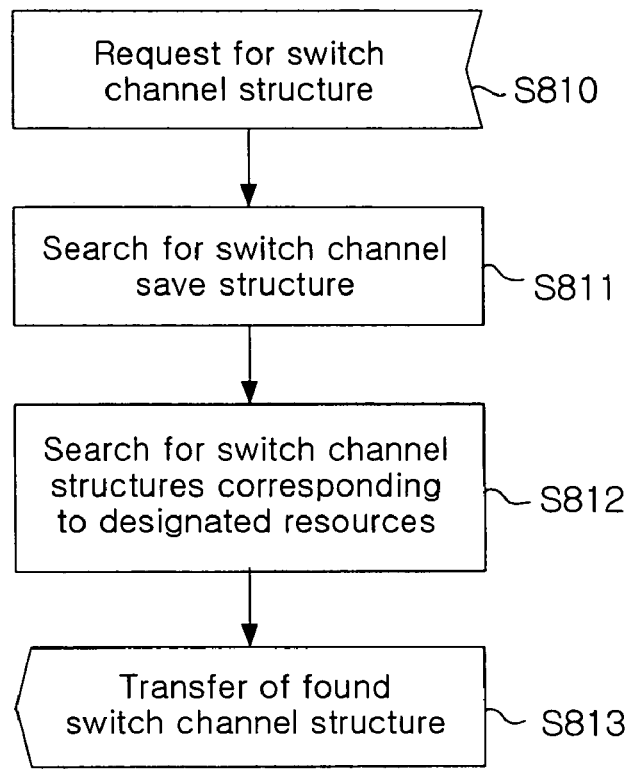
FIG. 8 is a flowchart showing the operation of the switch channel structure searching unit of FIG. 5.

FIG. 8 is a flowchart showing the operation of the switch channel structure searching unit 523. The switch channel structure searching unit 523 is operated in response to a request for changing information or releasing existing call and termination connection. When such a request is input, a switch channel save structure having a stream ID identical with the stream ID of the call or termination is searched for using the stream ID as a key at step S811. Switch channel structures corresponding to resources designated in a stream corresponding to a found switch channel save structure are searched for at step S812. Found switch channel structures, the information change or release of connection of which has been requested, are transferred at step S813. Meanwhile, when the input request is an information change request, a search result is transferred to the switch entry structure searching unit 524. In contrast, when the input request is a connection release request, the search result is transferred to the switch entry structure deleting unit 526.

Figure 9:
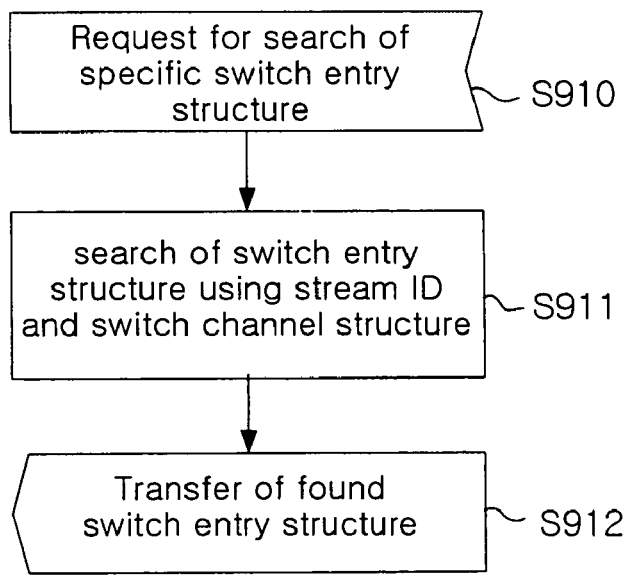
FIG. 9 is a flowchart showing the operation of the switch entry structure searching unit of FIG. 5.

The operation of the switch entry structure searching unit 525 having received the search result is performed according to the procedure shown in FIG. 9. If the switch channel structure of a corresponding channel, the information change of which is requested by the media gateway control unit 32, exists, the common call processing unit 32 requests the search of a switch entry structure associated with the found channel at step S910. The searching unit 525 searches for the switch entry structure using a stream ID, to which the channel belongs, and the found switch channel structure as keys at step S911, and transfers a search result at step S912. That is, the search result is transferred to the correcting unit 525 of the common call processing unit 32.

Figure 10:
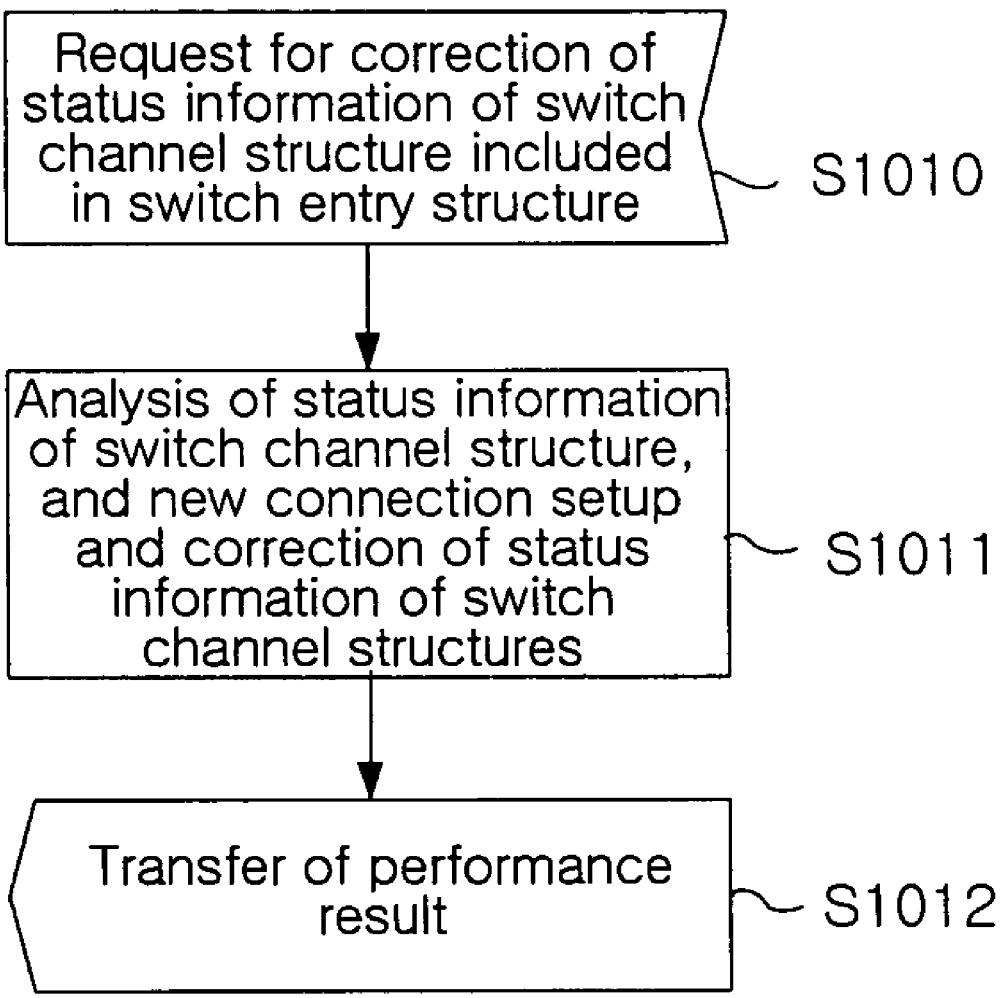
FIG. 10 is a flowchart showing the operation of the status information correcting unit of FIG. 5.

FIG. 10 is a flowchart showing the operation of the correcting unit 525. When a request for correcting the status information of a switch channel structure included in a switch entry structure, the correction of which has been requested, is input at step S1010, the correcting unit 525 analyzes the status information of two switch channel structures included in the switch entry structure and perform the setup of new connection, the correction of connection setup and the correction of the status information of the switch channel structure at step S1011. Thereafter, a performance result is transferred at step S1012.

Figure 11:
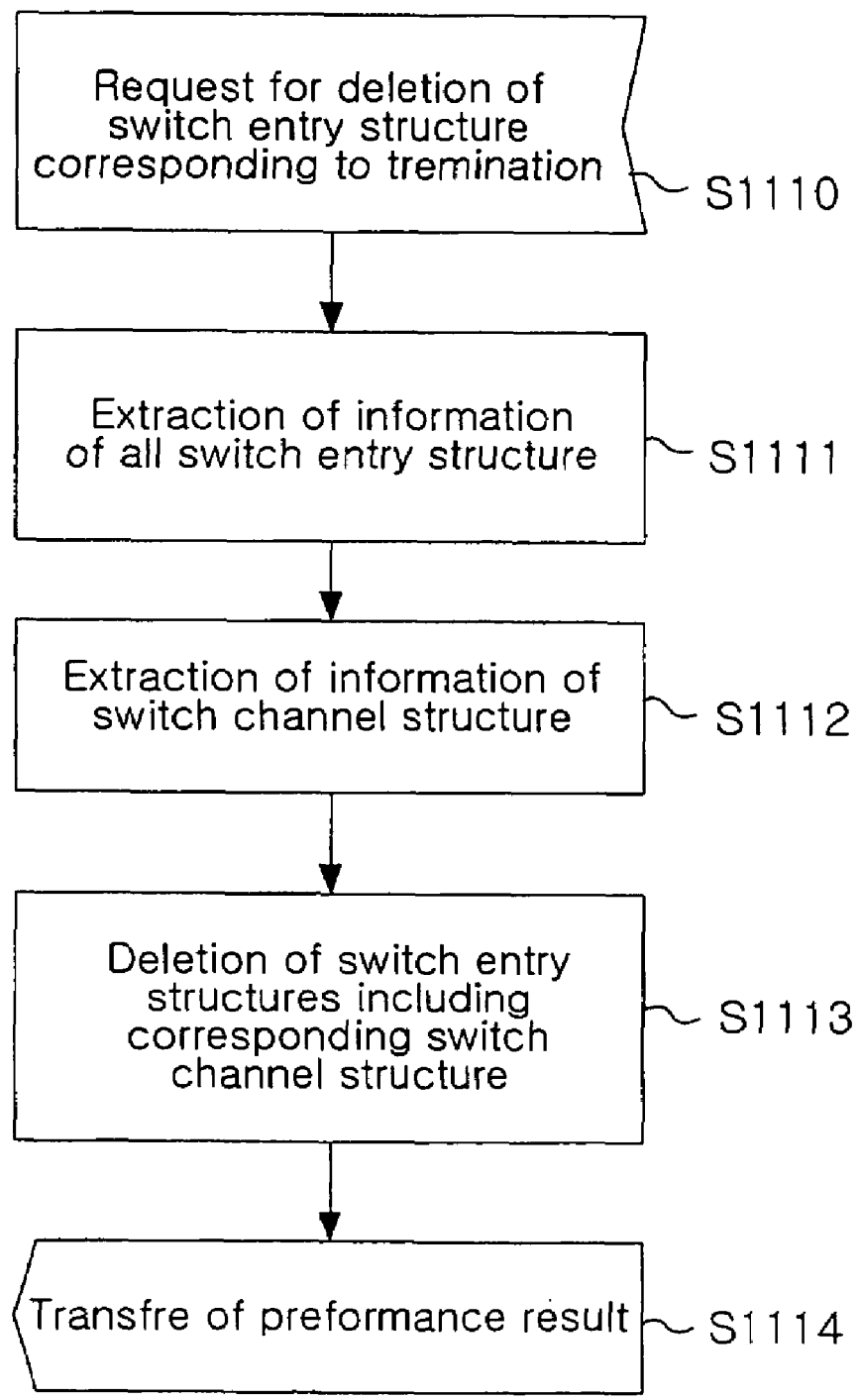
FIG. 11 is a flowchart showing the operation of the deleting unit of FIG. 5.

FIG. 11 is a flowchart showing the operation of the switch entry structure deleting unit 626 that performs deletion according to the search result. When a request for deleting a switch entry structure corresponding to a termination, the deletion of which has been requested, is input at step S1110, the information of all switch entry structures is received at step S1111. The information of corresponding channels and the information of the switch channel structure are extracted from the switch channel structure at step S1112. The value of the termination field is read from the switch channel structure, it is determined whether the read value corresponds to the requested termination, and switch entry structures including the switch channel structure having the corresponding value are deleted at step S1113. Thereafter, a performance result is transferred at step S1114. As described above, the common call processing unit 32 requests the release of channel connection and the release of connection between channels associated with the deleted switch entry structures from the DSP unit 36 through the media control interface unit 33.

As described above, the present invention provides a method of controlling common call connection and a media gateway for executing the method, which can deal with cases associated with various call control protocols for controlling a media gateway and the interworking of the various call control protocols, so that they can control common call connection through the mapping the cases into an implemented common call connection control model without the need for implementing a new call connection model whenever a new call connection control protocol is installed in the media gateway. Accordingly, the present invention is advantageous in that additional development costs and time required to accommodate various protocols in the media gateway can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling common call connection in a media gateway for converting a traffic format according to a communication network, comprising the steps of:

defining each of a plurality of termination points connected by a call in the media gateway as a termination, each of a plurality of multimedia services transmitted and received between the terminations through connection setup of the call as a stream, and each of a plurality of physical resources per multimedia service in the multimedia as a channel;

receiving a call processing request based on a specific media gateway control protocol;

if the call processing request is a connection setup request, receiving information corresponding to the defined channel and stream from the media gateway control protocol, and creating a switch channel structure for setting up a termination and a stream per channel that belongs to the call;

comparing the created switch channel structure with existing switch channel structures and creating a switch entry structure for setting up connection between channels that belong to a same stream; and requesting resource allocation and physical connection setup for the channel based on the created switch channel structure and switch entry structure.

2. The method as set forth in claim 1, if the call processing request is a termination change request, further comprising the steps of:

searching the existing switch channel structures for a switch channel structure associated with a channel designated in the termination;

searching for a switch entry structure for managing connection setup of the found switch channel structure;

analyzing status information of switch channel structures included in the found switch entry structure, and correcting status information of the switch entry structure based on a result of the analysis; and requesting attribute and connection setup of the corresponding channel according to the corrected status information of the switch entry structure.

3. The method as set forth in claim 1, if the call processing request is a call and termination connection release request, further comprising the steps of:

searching for a switch channel structure associated with designated call and termination;

searching for a switch entry structure associated with the found switch channel structure;

deleting the found switch entry structure; and requesting release of channel allocation and channel connection associated with the deleted switch entry structure.

4. The method as set forth in claim 1, further comprising the step of creating and updating a switch channel save structure for managing a switch channel structure list of channels associated with a stream.

5. The method as set forth in claim 1, wherein the switch channel structure comprises a field indicating a termination to which a corresponding channel belongs, a field indicating the corresponding channel, a field indicating a switching mode of the corresponding channel, and a field indicating an IDentification (ID) of a stream to which the corresponding channel belongs.

6. The method as set forth in claim 1, wherein the switch entry structure comprises a switch entry type field indicating a type of information of connection between channels, a field indicating a call to which corresponding connection information belongs, a field indicating a stream to which corresponding channel connection belongs, and fields indicating switch channel structures for managing information of two channels to be connected to each other, and a field indicating multiplexing functions of the channels when a multimedia service is implemented.

7. The method as set forth in claim 1, wherein the step of creating the switch channel structure comprises the steps of:

receiving a switch channel structure creation request with respect to a corresponding channel that belongs to the call, the connection setup of which has been requested;

allocating predetermined memory to the switch channel structure; and storing a termination value, a channel value, a mode value and a stream ID corresponding to a corresponding channel in the allocated memory.

8. The method as set forth in claim 4, wherein the step of creating the switch entry structure comprises the steps of:

searching the switch channel save structure for a switch channel structure list with respect to a channel that belongs to a stream designated in a call, connection setup of which has been requested, and that is previously set up;

creating a switch entry structure for designating connection with respect to the corresponding switch channel structure based on information of the found switch channel structure and the created switch channel structure;

adding the created switch entry structure to a switch table structure for managing a switch entry structure list; and adding a newly connected switch channel structure to the switch channel save structure.

9. The method as set forth in claim 2, wherein the step of searching for the switch channel structure comprises the steps of:

searching a switch channel save structure list for the switch channel save structure having a stream ID corresponding to the termination change which has been requested;

searching for a switch channel structure of channels that belong to the found switch channel save structure; and providing a found switch channel structure.

10. The method as set forth in claim 3, wherein the step of deleting the switch entry structure comprises the steps of:

extracting a currently created switch entry structure list from a switch table structure;

extracting information of a switch channel structure that belongs to the switch entry structure; and deleting the switch entry structure having a termination value corresponding to the call and termination connection release which has been requested, and deleting the switch entry structure from the switch table structure list.

11. A media gateway, comprising:

a plurality of media gateway control units for requesting call connection, release of connection and change of connection according to installed media gateway control protocols;

a common call processing unit for defining a call, processing of which has been requested by one of the media gateway units, using two or more terminations corresponding to a plurality of endpoints to be connected in the call, one or more streams that belong to each of the terminations, and one or more channels corresponding to media resources that belong to each of the streams, and making requests for resource allocation to a channel belonging to a corresponding termination, connection setup between channels, and resource allocation and connection release and connection status information change with respect to a channel belonging to a designated termination when call processing has been requested;

an interface unit for transferring the requests of the common call processing unit to respective devices;

a Digital Signal Processing (DSP) control unit for instructing a digital processing unit associated with a designated link to perform physical circuit connection and channel allocation according to the requests transferred through the interface unit;

a plurality of DSP units connected to physical circuits to perform allocation of a physical resource and release of allocation with respect to a corresponding channel according to instructions of the DSP unit; and a switch fabric for performing physical connection and release of a physical resource allocated to a channel according to instructions of the DSP control unit, wherein the common call processing unit creates, manages and deletes a switch channel structure for managing information of channels that belong to each termination, a switch entry structure for managing information of connection between the channels, a switch table structure for managing a switch entry list, and a switch channel save structure for managing switch channel structures of channels that belong to a single call.

12. The media gateway as set forth in claim 11, wherein the common call processing unit comprises:

a switch channel structure creating unit for creating a switch channel structure for managing information of channels belonging to a corresponding termination in response to a request for setup of a new call or the termination;

a switch entry structure creating unit for creating a switch entry structure for managing information of connection of a corresponding channel to other channels when the switch channel structure is created in the switch channel structure creating unit;

a switch channel structure searching unit for searching for a switch channel structure associated with a designated termination when information change and release of connection of a call or the designated termination is requested;

a switch entry structure searching unit for searching for a switch entry structure associated with the switch channel structure found by the switch channel structure searching unit;

a status information correcting unit for analyzing status information of channels belonging to the switch entry structure found by the switch entry structure searching unit and correcting the status information; and a deleting unit for deleting all switch entry structures associated with the switch channel structure found by the switch channel structure searching unit.

13. The media gateway as set forth in claim 11, wherein: the switch channel structure comprises:

a field indicating a termination to which a corresponding channel belongs, a field indicating the corresponding channel, a field indicating a switching mode of the corresponding channel, and a field indicating an ID of a stream to which the corresponding channel belongs;

the switch entry structure comprises: a switch entry type field indicating a type of connection information between channels, a field indicating a call to which corresponding connection information belongs, a field indicating a stream to which corresponding channel connection belongs, and fields indicating switch channel structures for managing information of two channels to be connected to each other, and a field indicating multiplexing functions of the channels when a multimedia service is implemented.

14. A computer-readable storage medium storing a program for executing the method set forth in any of claims 1 to 10.

* * * * *